Patented Nov. 11, 1952

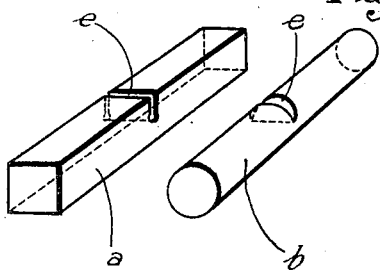
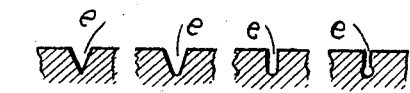
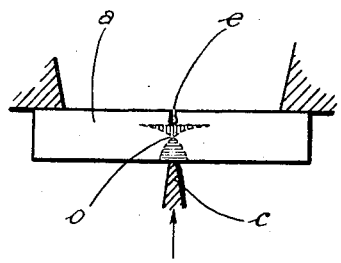
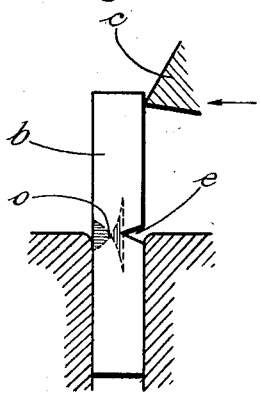
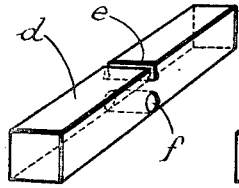
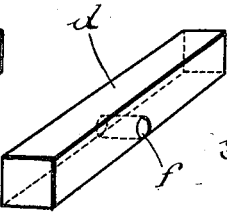
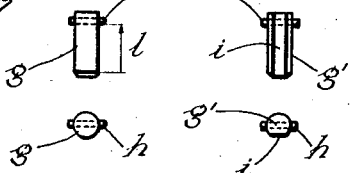
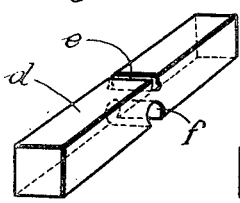
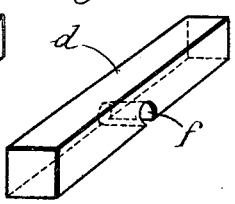
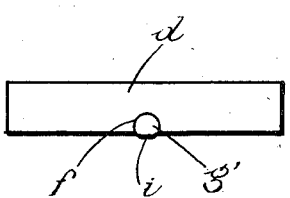

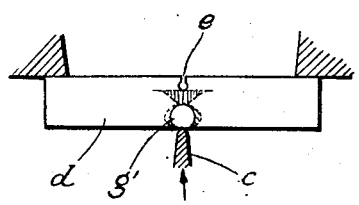
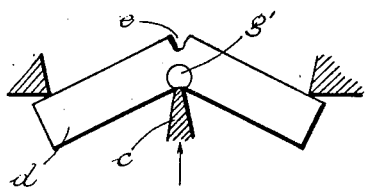
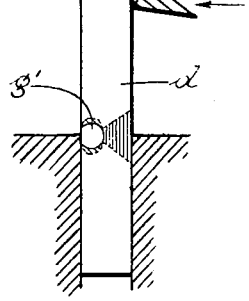
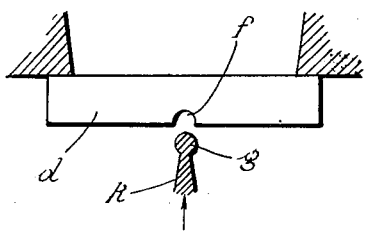
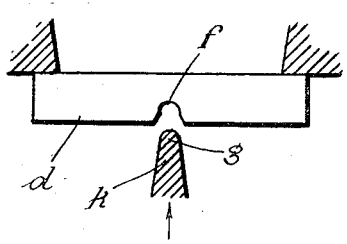
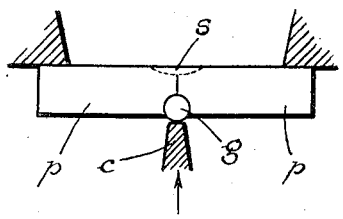

2,617,293

UNITED STATES PATENT OFFICE 2,617,293

SPECIMENS FOR USE IN DETERMINING THE BRITTLENESS OF MATERIALS

Henri Schnadt, Brussels, Belgium

Application July 17, 1947, Serial No. 761,484
In Belgium May 27, 1942

Section 1, Public Law 690, August 8, 1946
Patent expires May 27, 1962

5 Claims. (Cl. 73—101)

It is very important in practice to be able to determine the brittleness of materials, that is to say, their inability to withstand dynamic stresses or shock or the propagation of existing fissures. Great difficulties have, however, been found in exactly measuring the brittleness by characteristic figures such as those obtained by subjecting samples of reduced dimensions taken from the material in question, to suitable mechanical tests.

At present, most of the tests made to determine the brittleness take place by subjecting a sample provided, usually in its centre, with a notch intended to localise the section of rupture, to the shock of a knife, a measuring apparatus indicating (for example in kgs. per cm.$^2$) the work absorbed on the rupture of the sample. Two types of test samples are generally used: the test sample of the Charpy type which is a small prismatic bar of square section, provided with a transverse slot terminated internally by a small rounded part bored or drilled and the test sample of the Izod type of prismatic or cylindrical shape provided with a sharp angled notch made by a milling machine. In testing, the sample of the Charpy type, supported at its extremities is struck by the knife opposite the notch, whilst that of the Izod type is fixed at one extremity and struck by the knife near its other extremity.

It has been found that the existing test samples and their method of rupture give rise to serious inconveniences which it has not yet been possible to eliminate; that in particular the results of tests instead of being constant for the same material, present considerable accidental disparities and that the rules of similarity are not applicable to test samples of different sections even if they are of the same type.

Other drawbacks of the present processes are as follows:

(1) The rupture of present-day samples takes place by flexion of their section of rupture about an instantaneous axis of rotation (neutral axis) necessarily located in this same section. Whereas in a part of this section the material undergoes traction stresses, it is subjected in the other part to compression stresses. These latter are generally sufficiently important to produce plastic deformations so that the result of the test, that is to say the total work absorbed on the rupture, represents the sum of traction work and compression work.

Now, such methods of stressing and of deformation differ appreciably from those which are generally the cause of ruptures by a single shock or by repeated shocks on parts in service (parts of bridges, of machines, of ships, etc.) since either these are produced by pure traction, any phenomenon of compression being then absent or if there is flexion the compressed zones are thrust far from the place where the rupture starts, and in this case also there is no plastic deformation of compression. The tests made with the usual samples therefore give results which are too favorable, since the work absorbed on their rupture is too great in comparison with the work actually necessary to break the parts in service.

(2) When it is a question of a not very brittle material (for example, stainless steel 18/8 or nickel), the rupture of the present samples is only partial, so that the result of the test no longer expresses the total work of rupture but a different characteristic which it is not possible to correctly interpret.

(3) If, before breaking, the sample bends considerably, the radius of the edge of the knife of the pendulum exerts a marked influence on the result of the test; the figures obtained with two different knives are only comparable if they have radii strictly identical.

(4) Owing to the method of rupture of present test samples, it is necessary to give their section of rupture minimum dimensions. Generally the height of this section cannot be less than 5 mm., in any case it cannot be less than 3 mm. These samples cannot therefore be suitable for the determination of the brittleness of very small zones, that is to say, of zones smaller than the minimum extent of the section of rupture. Now, the knowledge of the brittleness of such zones is of prime importance in the study of numerous present-day technical problems (local heterogeneities of metals, weldability of steels, etc.).

(5) The test samples at present used do not permit of determining the brittleness of the zones of a material which are located close to or even on its surface, for the notch with which these samples are always provided necessarily transfers the zone of rupture to a distance from the surface equal to the depth of the notch.

(6) For the same reason, the present-day test samples likewise do not permit of determining under comparable conditions of test, the brittleness of a material not notched.

The present invention has for its object novel shapes of samples intended to obviate the above drawbacks.

According to this invention, instead of allowing the material of the test sample to deflect on itself, that is to say, about an instantaneous axis of rotation located in the section of rupture, there is placed in line with the section of the sample which will be stressed up to rupture, a core which guides the movement of the material in the course of flexion, so as to obviate or reduce the plastic deformations of compression ordinarily undergone by the material in the vicinity of the section of rupture. It is important that the core or piece should be practically indeformable and therefore of hard material and that it should preferably be of cylindrical shape of circular section in order that the metal of the two parts of the test sample which will be separated by the rupture, carry out a rotation about its axis. There is thus substituted for the instantaneous axis of rotation which in usual processes is located in the section of rupture of the material, a fixed axis of rotation located in the extension of the section of rupture and coinciding with the axis of the cylindrical core. It is advisable that the diameter of the cylinder should be fairly large, as compared with the height of the section of rupture, so that the guiding effect of the core should be shown from the commencement of the flexion.

In the most advantageous method of carrying out the process, the core is introduced into the test sample itself, which has been previously bored to this end with a channel or recess of shape and dimensions exactly corresponding to those of the core. Under the shock, the core not only undergoes the compression and distributes more advantageously the effects thereof, but furthermore serves as support and as guide to the material which surrounds it.

According to a modification, the core is carried by the extremity of the striking knife and strikes the test sample in a cavity exactly fitting to its shape.

In both cases, the test sample may be provided with a notch, for example on its face opposite to the recess for the core, when the axis of this latter must be in the central plane of the notch. But it is not at all indispensable for the test sample to be notched, for the presence of the channel or of the cavity serving to take the core suffices to localise the section of rupture; the invention thus permitting of making tests of great interest with samples not notched, which has not so far been possible.

The invention also permits of subjecting weldings of two pieces to tests for brittleness. The recess for the core is then preferably formed in the faces in contact of the parts united by a welded seam; the process of rupture remains the same, the material here constituted by the weld, carrying out a rotation about the core which serves as guide.

The invention will be described more in detail and with reference to the annexed diagrammatic drawings, given by way of example and in which:

Figs. 1a and 1b represent two test samples of current type;

Figs. 2a, 2b, 2c and 2d show usual forms of notches;

Figs. 3 and 4 respectively indicate the method of striking samples of the Charpy and Izod types and the distribution of the stresses in the rupture section.

Figs. 5, 6, 7 and 8 show in perspective test samples according to the present invention.

Figs. 9a, 9b, 10a and 10b show cores adapted respectively to the test samples of Figs. 5 and 6 and of Figs. 7 and 8.

Fig. 11 is a front view of a test sample according to the invention with a core of the type of Figs. 10a and 10b.

Fig. 12 indicates the method of striking and the new distribution of the tensions, and Fig. 13 shows the method of rupture of the test sample according to Fig. 8 (test by Charpy pendulum).

Fig. 14 indicates also the method of striking in the test by the Izod pendulum.

Figs. 15 and 16 show arrangements of the core on the knife.

Fig. 17 represents the application of the invention to determine the brittleness of a welded seam.

The test sample shown by Fig. 1a is that of Charpy type and Fig. 1b is that of the Izod type. The test sample $a$ of square section has a notch $e$ terminated by a rounded end, leaving a section of reduced height which will be the section of rupture. The test sample $b$ of round section has an angular notch produced by a milling cutter. Figs. 2a, 2b, 2c and 2d show different but usual forms of notches.

In testing, the test sample $a$ is supported at its two extremities and is struck by the punch $c$ opposite the notch $e$. At this moment, as shown by the diagram of Fig. 3, the zone shaded with vertical etchings, shown above the instantaneous axis of rotation $o$, is subjected to traction, and the zone shaded with horizontal etchings, below this axis, is subjected to compression. The aspect of the fracture of such a test sample shows almost always that the compression stresses have caused plastic deformation of the same sense, which explains the drawback pointed out above under 1. The test sample $b$ is held between the jaws of a fixed holder and receives the shock of the punch $c'$ near its upper extremity (Fig. 4). It gives rise to the same drawback, the distribution of the stresses being similar.

The test sample $d$ according to the present invention has as a characteristic element a transverse cylindrical channel $f$ of circular section, which runs through it from side to side and may be located quite close to one of the faces of the test sample as shown on Figs. 5 and 6, or may cut this face as shown by Figs. 7 and 8. This channel $f$ is intended to take before the test a small cylindrical core $g$ which fits exactly therein.

The test samples $d$ may be of any suitable section, such as square, rectangular or round, and be provided with a notch (Figs. 5 and 7) or not (Figs. 6 and 8). In the first case, the notch $e$ which itself may have any suitable form, for example one of those shown by Fig. 2, must be in the transverse plane passing through the axis of the channel $f$. In the second case, the channel $f$ alone is sufficient to localise the section of rupture.

The small cylinder $g$ is for example rounded at one end and carries at the other end a stop pin $h$ (Fig. 9). The length $l$ comprised between the pin $h$ and the rounded part is preferably a little more than the depth of the channel $f$. If the test sample is metal, the cylinder $g$ is preferably of steel treated in such manner as to make it hard but not too brittle (sorbitic or troostitic structure, for example).

When the channel $f$ is open along one side as on Figs. 7 and 8, there is preferably used a cylindrical core such as $g'$ (Figs. 10a and 10b) having a longitudinal flat surface $i$ which is flush with (Fig. 12) or projects beyond (Fig. 11) the two edges of the adjacent face of the test sample and is intended to take the shock of the punch. But there can also be used a complete cylinder if there be given to the punch a flat striking surface (Fig. 17).

The tests of the test samples provided with a cylindrical core may take place by means of the usual apparatus. In the case of using the Charpy pendulum, the test sample is placed in position, so that the punch $c$ of the pendulum strikes it exactly in the axis of the cylinder (Fig. 12).

It is then found that the process of rupture of the test sample is very different from that of the ordinary test sample. Actually, owing to the presence of the cylindrical core the instantaneous axis of rotation is no longer in the section of rupture but in the space occupied by the core and the zone of compression relative to the plane of the section of rupture is shifted outside the material of the test sample.

Fig. 12 shows the distribution of the stresses at the moment of the shock. At the position of the section of rupture of the test sample, the material simply undergoes traction stresses the distribution of which is shown by the zone of vertical etching, whilst the compression stresses are entirely shifted into the body of the cylinder $g'$ and around this according to the distribution indicated by the zone of the oblique etchings. Due to this better distribution of the stresses in the material of the test sample, the maximum unit value of the compression stresses is never sufficiently great to produce therein a plastic deformation. It follows that the work carried out to produce the rupture will practically only correspond to a work of deformation by traction. In the course of the flexion of the test sample, its two halves describe a rotation about the axis of the cylinder $g'$ (Fig. 13). The test sample breaks at the moment when the capacity of deformation by traction of the material is exhausted.

A similar procedure takes place when the test sample $d$ is embedded (Fig. 14) and struck by a punch $c'$ in the manner of the Izod test. Here, as in the case of the test with the Charpy pendulum, the stresses developed at the section of rupture are simply traction stresses.

According to a modification, instead of being previously located in the test sample, the small core $g$ intended to guide the flexion of the material is, as shown by Figs. 15 and 16, carried by the punch $k$ of the pendulum and it is introduced into the channel $f$ at the moment of the shock. It is then advisable that the width of inlet of the channel $f$ should be at least equal to the diameter of the core $c$ and that the connection of the latter with the punch (Fig. 15) or the profile of the inlet of the channel $f$ (Fig. 16) should be such that the flexion can be produced, eliminating as much as possible the deformation by compression of the material of the test sample. The process of rupture is similar to that shown by Fig. 13.

In the example shown by Fig. 17, the process of rupture according to the invention is carried out on a weld uniting two metal pieces $p$ placed end to end. The zone $s$ is formed by a welded seam, the excess of metal being planed off, and the core $g$ is introduced into a recess formed by a suitable aperture between the adjacent faces of the parts $p$. Instead of being of the shape shown, this recess may also be of sufficient width to permit the use of a core similar to those of Figs. 15 and 16.

The different methods of execution described above permit of ascertaining that the present invention may be applied if desired while adhering to the shapes and dimensions of current test samples and using the existing testing apparatus.

The dimension of the channel intended to take the core will be determined acording to those of the test sample in such manner that on the flexion the instantaneous axis of rotation of the section of rupture is preferably shifted outside the material subjected to the test, and the rupture of the test sample takes place simply by traction. If the core and its recess are of too small a diameter, the advantages of the invention are only partially attained, since at the commencement of the flexion, the instantaneous axis of rotation is still in the section of rupture of the test sample, and the material in the vicinity of this section will undergo a plastic deformation of compression until the shifting of the instantaneous axis in the course of the flexion carries it into the body of the core. By way of example, with a test sample of metal, notched or otherwise, of square section 10 x 10 mm. and 55 mm. in length, there will be preferably given to the channel $f$ a diameter of 4 to 5 mm. the core $g$ having to exactly fit in this channel.

The use of samples according to the invention permits of obtaining a much greater constancy in the results of tests made on the same material and of rendering applicable, in certain interesting cases, the rules of similitude.

The other drawbacks pointed out above are furthermore completely eliminated, thus:

(1) The results of the tests are no longer influenced by the existence of work of deformation by parasitic compression. The method of stressing is always very similar to those which cause sudden ruptures of parts in use.

(2) The test sample always breaks even if the material tested is not very brittle.

(3) The angle of rupture being always very slight, even for metals not very brittle, the radius of the edge of the punch of the pendulum no longer exerts any influence. This influence is furthermore totally excluded when the punch strikes the core.

(4) The section of rupture of the test sample may be made as small as desired, no lower limit being any longer imposed. This permits on the other hand of using pendulums of much smaller power and thus less costly.

(5) and (6) As the test can take place with test samples not notched, it is possible to measure the brittleness of the surface zones.

Although shock tests have been more particularly kept in mind in the foregoing, the process according to the invention is equally applicable and ensures the same advantages when the punch or similar element exerts a slow and progressive action on the test sample.

It must also be understood that the invention is not restricted to the details of execution described and that modifications may be made therein. Thus, in particular, the cores may be of a different shape from that of a cylinder of revolution, for example an oval section although in general the circular section is preferable both from the point of view of facility in the manufacture of the test samples as from that of the regularity of the results of the tests.

The specimens according to the invention, although particularly applicable to determining the brittleness of metals, are also suitable for determining the brittleness of other materials, in particular of moulded synthetic substances.

I claim:

1. The combination with a bar-shaped test sample having near the surface thereof a channel of circular cross-section intermediate the ends of said sample and extending transversely thereof, of a hard cylindrical core supported in said channel and having a snug fit.

2. The combination with a parallelepipedic test sample having a channel of circular cross-section extending transversely thereof and intersecting one of the faces of said sample, of a hard cylindrical core supported in said channel and having a snug fit.

3. The combination with a test sample having a channel of circular cross-section extending transversely thereof and parallel with one of the faces of said sample, said channel intersecting one of the faces of said sample and forming a gap therein, of a hard cylindrical core supported in said channel and having a snug fit, said core having a flat side facing said gap.

4. The combination with a parallelepipedic test sample having near the surface and intermediate the ends thereof a channel of circular cross-section extending transversely thereof, of a hard cylindrical core supported in said channel and having a snug fit, said sample having a notch formed in the face opposite that adjoining said core, the central plane of said notch passing through the axis of said channel.

5. The combination wtih a bar-shaped test sample formed of two parts placed end to end, welded together and recessed at their adjoining faces so as to form a channel of circular cross-section near the surface thereof, of a hard cylindrical core supported in said channel and having a snug fit.

HENRI SCHNADT.

REFERENCES CITED

The following references are of record in the file of this patent:

UNITED STATES PATENTS

| Number | Name | Date |
|---|---|---|
| 1,329,192 | McAdam Jr. | Jan. 27, 1920 |
| 1,678,017 | Midgley | July 28, 1928 |
| 1,703,928 | Gastrich | Mar. 5, 1929 |
| 1,797,882 | Scott | Mar. 24, 1931 |
| 2,030,418 | Warner | Feb. 11, 1936 |

FOREIGN PATENTS

| Number | Country | Date |
|---|---|---|
| 593,912 | Germany | Mar. 10, 1934 |

OTHER REFERENCES

Batson and Hyde, Mechanical Testing, vol. 1, pp. 298 to 301. Published by Chapman and Hall, Ltd., London, in 1922.